J. P. TARBOX & H. KLECKLER.
UNIVERSAL WING POST SOCKET.
APPLICATION FILED SEPT. 18, 1915.
1,228,375.
Patented May 29, 1917.
2 SHEETS—SHEET 1.
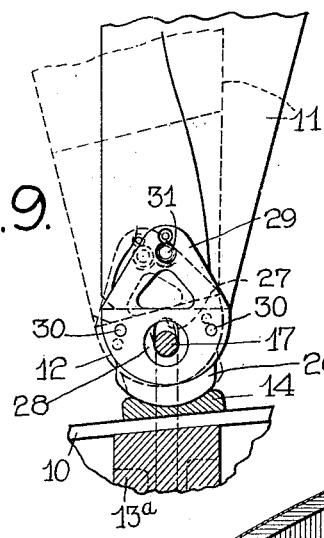
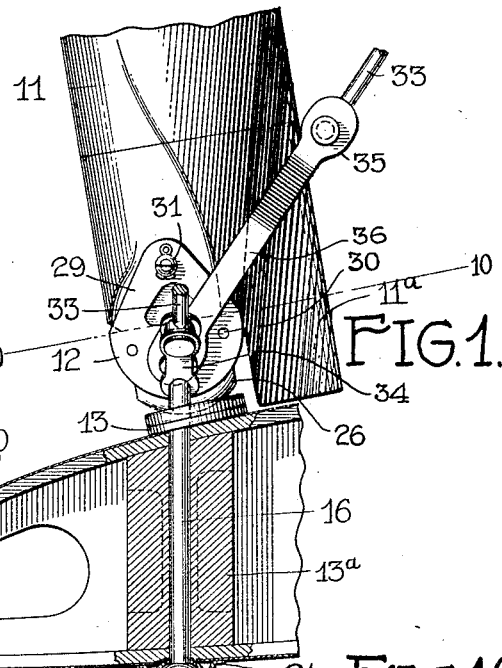
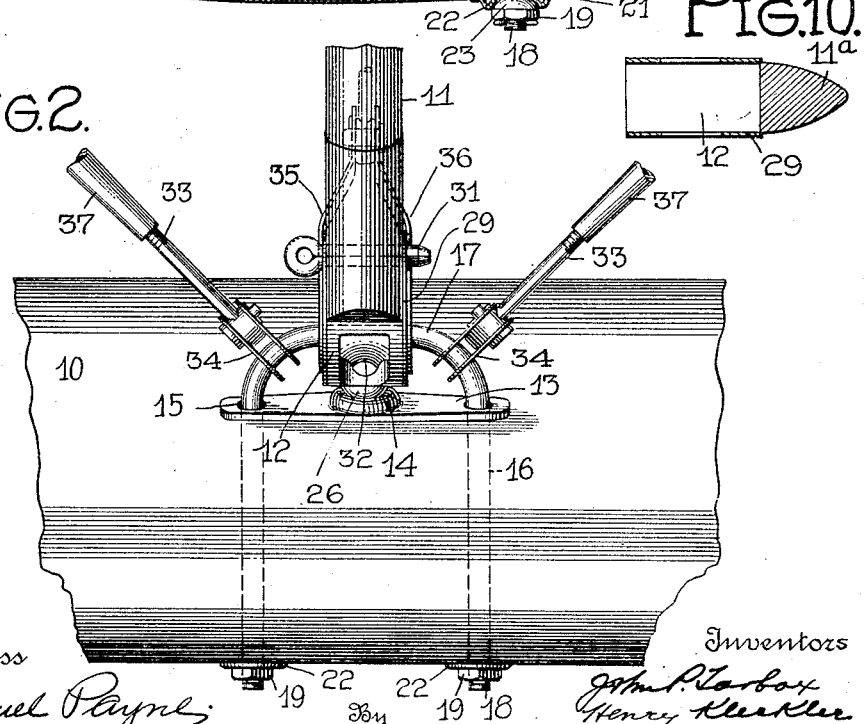
Witness
Samuel Payne
Inventors
John P. Tarbox
Henry Kleckler
By John P. Tarbox
Attorneys J. P. TARBOX & H. KLECKLER.
UNIVERSAL WING POST SOCKET.
APPLICATION FILED SEPT. 18, 1915.

1,228,375.

Patented May 29, 1917.
2 SHEETS—SHEET 2.

UNITED STATES PATENT OFFICE.

JOHN P. TARBOX AND HENRY KLECKLER, OF BUFFALO, NEW YORK, ASSIGNORS TO CURTISS AEROPLANE & MOTOR CORPORATION, A CORPORATION OF NEW YORK.

UNIVERSAL WING-POST SOCKET.

1,228,375.        Specification of Letters Patent.        Patented May 29, 1917.

Application filed September 18, 1915. Serial No. 51,458.

*To all whom it may concern:*

Be it known that we, JOHN P. TARBOX and HENRY KLECKLER, citizens of the United States, residing at Buffalo, in the county of Erie and State of New York, have invented certain new and useful Improvements in Universal Wing-Post Sockets, of which the following is a specification.

The present invention relates to an improved form of socket connection which is especially adapted for use in adjustably attaching the terminals of biplane wing posts to the wings thereof.

As its principal object, this invention contemplates the provision of a socket which shall be capable of universal application to any portion of a biplane wing for the purpose of adjustably mounting a wing post thereon, irrespective of the degree of camber of the wing, its thickness or the angle at which the fitting must be employed.

Another object of this invention is to provide a socket of this character which is of relatively simple construction and which is designed with such regard to proportion, number and arrangement of parts that it will be durable and efficient in service, and may be readily applied to or removed from a wing post and wing, while being as readily adjusted when in position.

More specifically, it is the object of this invention to produce a socket connection consisting essentially of a pair of adjustably mating elements, and a member loosely passing through both of said elements to normally clamp them in the desired relation, the said member being releasable to permit such relative movement of the mating elements that the wing post may be adjusted in a plane transverse of the wings to change the stagger of the latter, or may be swung in a plane longitudinal with respect to the wings for changing the dihedral angle thereof.

A further object of the invention is to provide as a means for connecting the two mating elements of the socket, a U-bolt which is so positioned and related with respect to the wing and the post that it may serve as an anchor for both the drift or lift wires and cables, and by virtue of its shape permit automatic adjustment of the lines of pull of these cables.

The above and additional objects of a similar nature which will be hereinafter more specifically treated, are accomplished by such means as are illustrated in the accompanying drawings, described in the following specification, and then more particularly pointed out in the claims which are appended hereto and form a part of this application.

With reference to drawings wherein there has been illustrated the preferred embodiment of the invention as it is reduced to practice and throughout the several views of which like reference numerals designate corresponding parts;

Figure 1 is a biplane wing showing the application of the socket connection comprehended by this invention for the adjustable support of a wing post;

Fig. 2 is a view in front elevation of the same subject matter;

Fig. 9 is a view illustrating in full and dotted lines the manner of adjustment of a wing post equipped with the socket of this invention, and Fig. 10 is a transverse section through a wing post.

In accomplishment of the objects previously set forth, there is provided a socket connection which includes as its essential features, a socket plate, a bearing block adapted to be adjustably seated within the plate, and a U-bolt connecting the block and the plate in such manner as to permit adjustment therebetween in a pair of rectangularly opposed planes.

The socket plate is mounted upon the wing at the desired point of connection for the wing post, the terminal of the latter being equipped with the bearing element to be received by the plate for adjustment, and a U-bolt having its bight portion loosely engaged with said element is also formed with arms serving to prevent displacement of the socket plate upon the wing, the arms extending through the plate and the adjacent wing spar.

The bearing block is accompanied by attaching plates disposed to engage opposite faces of a wing post terminal and to receive the pin, bolt or other fastening means to properly mount the block upon the post. The lower portion of the block is shaped as a torus as will be hereinafter more specifically pointed out, and is adapted to seat within an elongated socket, with which the socket plate is provided, in such manner that the post may be swung in the direction of either the major or minor axes of the socket for varying the relative stagger or dihedral angle of the wings, respectively.

More particularly described, the block may be said to be maintained against displacement from its socket in the matter of degree of adjustment by clamping arrangement of the U-bolt, the bight portion of which embraces the torus of the block, and is disposed to comprehend the outer center from which the torus is described, such center in this case obviously lying adjacent the circumference of the generating circle of the torus, although not necessarily so.

The arms of the U-bolt pass through the socket plate and the wing spar, as previously stated, and are connected by a bolt plate and held against withdrawal therefrom by nuts or equivalent fastening means which are applied to their lower terminals. Preferably each such nut is formed with an integral bearing portion adapted to rest within a receptive socket accompanying the bolt plate in order to prevent direct contact between the nuts and the wing surface. Apparently by this construction the nuts may be loosened to release the bolt so that the torus portion of the bearing block may be adjusted in its socket in either a transverse or longitudinal plane with respect to the wing. On the other hand, the nuts may be tightened upon the bolt to clamp the torus portion of the bearing block firmly in its adjusted position.

Figure 7:
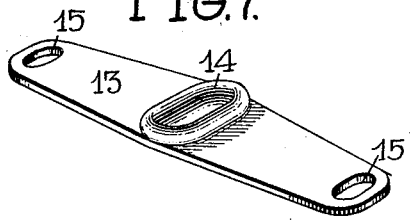
Fig. 7 is a perspective detail of the socket plate.

Undertaking a more detailed description of the drawings in accordance with the foregoing brief outline, the numeral 10 is employed to designate a biplane wing which is adapted to be connected with its mate by a series of wing posts 11 which it is the object of this invention to adjustably connect to respective wings. This connection includes the bearing block 12 carried by the wing post and the socket plate 13 supported upon the wing, preferably over one of the spars 13ª for the latter. The socket plate, as is illustrated to advantage in Fig. 7, comprises an elongated bar or plate which is centrally formed with a socket 14 of an oval configuration, and is terminally provided with apertures 15 for reception of the arms 16 of the U-bolt whose bight portion is denoted by the numeral 17, the arms of such U-bolt passing centrally through the wing spar and having their extremities threaded, as shown at 18, for the reception of the usual nuts 19.

Figure 8:
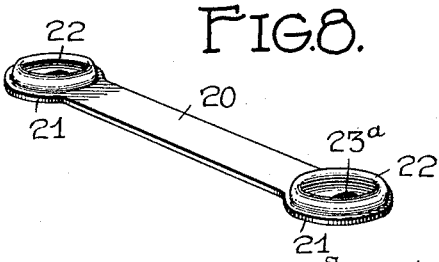
Fig. 8 is a similar view of the bolt plate.

The bolt plate, such as accorded the numeral 20 and separately illustrated in Fig. 8, comprises an elongated flattened bar the ends of which are circularly enlarged to form bases 21 from which may be integrally struck up the socket portions 22 adapted to receive the substantially hemispherical bearing portions 23 which are enlarged upon respective nuts 19. By this means the universality of application of the socket connection is assured, since the nuts 19 are able to exert the requisite clamping pressure upon this washer plate 20 without regard to the angle between such plate and the bolt arms, the plate being provided with elongated slots 23ª permitting change of such angle.

Figure 3:
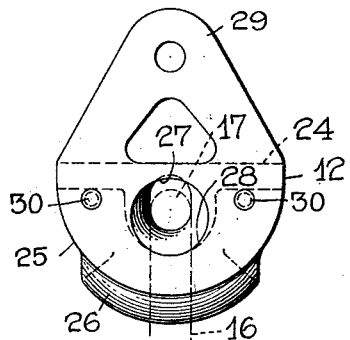
Fig. 3 is a detail side elevation of the bearing block provided as one of the mating members of the socket connection.
Figure 4:
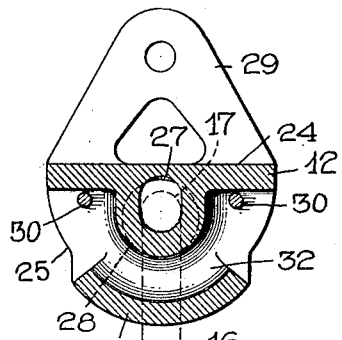
Fig. 4 is a central sectional view through the block.
Figure 5:
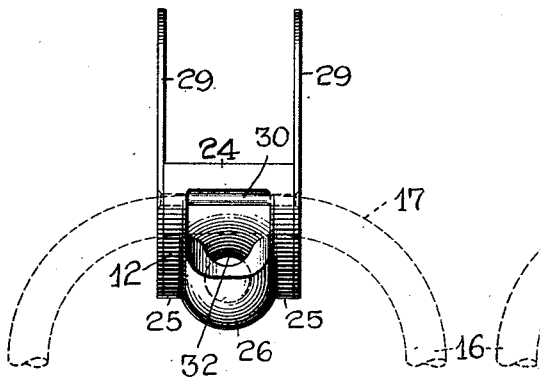
Fig. 5 is an end or edge view of the bearing block in elevation.
Figure 6:
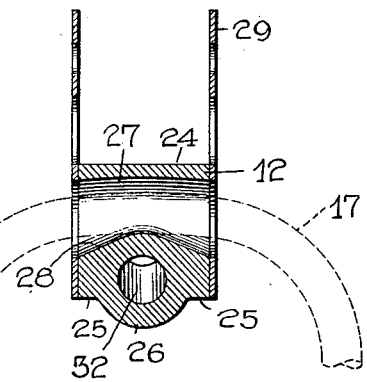
Fig. 6 is a central sectional view through the block at right angles to Fig. 4.

The foregoing completes the description of the wing attached portion of the present socket connection, and it now remains to set forth the mating portion of the connection arranged for co-acting relationship upon the terminals of the wing posts 11. The block 12 is cast or otherwise formed of a metal of a suitable durability and in the substantially semi-cylindrical manner illustrated in Figs. 3 to 6 inclusive, having the flat diametrical portion 24 and the accompanying rounded periphery 25, the latter of which, however, is enlarged to provide a projecting torus portion 26 which acts as the bearing and which is arranged to have a bearing seat within the socket 14 of the socket plate. Transversely of the block and the above torus portion 26 is provided the boring 27 which is terminally enlarged in the conical manner designated by the numerals 28 of Figs. 3 and 6, although centrally such boring is substantially tangential to the circumference of the generating circle of the torus, reference being here made to Fig. 6 in particular.

Attaching plates 29 are secured to each other and to the lateral faces of the block 12 through the medium of suitable fastening means 30, here illustrated as pins, but obviously capable of partaking of any desirable nature. Bolt or pin means 31 pass through the attaching plates and the lower terminal of the wing post 11 at the terminal of which the block 12 is to be arranged. Interior portions of the block 12 and of its accompanying torus portion are removed for the lightening of the block without sacrifice of strength, as is indicated by the numeral 32 of Fig. 4, and a jog 11ª is formed at the bottom of each wing post, the rear edge of which is prolonged in a streamline form, to serve the desirable and well known purpose of carrying the air rearwardly from the socket.

In arrangement, the bight portion 17 of the U-bolt is passed into the boring 27 of the block and the arms of the bolt through the socket plate and its supporting wing, being subsequently connected by the bolt plate 20, and equipped with nuts 19 which contact with the plate 20, when tightened, to produce the necessary clamping pressure, drawing the torus portion 26 of the block firmly into the socket 14 for maintenance of its adjusted position therein.

Oscillation of the post along the major axis of the oval socket 14, that is, transversely with respect to the wing, will alter the stagger of the wings of the biplane. On the other hand, oscillation of the torus portion along the minor axis of the oval socket 14 which will be longitudinal with respect to the wing, will alter the dihedral angle of the wings. These latter oscillations utilize the conical borings 28 enlarging the transverse boring 27 of the block, as should be apparent from an inspection of Fig. 6. The arrangement of the bight portion 17 of the U-bolt and the torus portion 26 of the block is such that the latter comprehends the outer center from which the generating circle of the torus is swung, so that the bight portion can form the axis of oscillation for the wing post terminal for transverse movements of the wing posts, while the torus portion itself is not interfered with by the bolt during longitudinal oscillations of the post.

The advantage of using a bolt to connect the mating elements of a wing post socket of this character which will employ its arms for fastening purposes and its bight portion as an axis of oscillation in the manner above described, is that such a connection is adapted to serve as an anchor for the drift and lift wires or cables 33 which cross-connect adjacent posts both transversely and longitudinally of the wings. In the present instance clevises 34 are shown as complementally connected to the bight portion of the bolt, and longitudinally of the wing, while the rearwardly extending clevis 35 is formed with fork plates 36 which pass by each side of the post terminal 11 for a similar securement to the bolt. As a means for adjustment of the wires 33 suitable turnbuckles 37 are preferably provided.

From the foregoing it is believed that means have been disclosed whereby the accomplishment of the previously described objects will be obviously ready of attainment. While in the foregoing, however, there has been illustrated and described the combination and arrangement of elements constituting the preferred embodiment of the present invention, it is desired to emphasize the fact that such alterations in the matters of proportion and degree may be made in later adaptations of this invention as are defined by the appended claims.

What we claim is:

1. A wing post socket of the character described, including a socket plate, a bearing block, and means independent of the plate for freely connecting the block and plate whereby the block may be oscillated in rectangularly opposed planes.

2. A wing post socket of the character described including a socket plate, a bearing block and means freely connecting the block and plate and at the same time limiting oscillatory movement of the former in a pair of rectangularly opposed planes.

3. A wing post socket of the character described, including a socket plate, a bearing block, and means independent of the plate for freely connecting the block and the plate whereby the block may be oscillated in a plane extending transversely with respect to the wing, and in a plane extending longitudinally with respect to the wing.

4. A wing post socket of the character described including a socket plate, a bearing block and means dually functioning to freely connect the block and plate and to limit oscillatory movement of the block on axes in transverse planes.

5. A wing post socket of the character described, including a socket plate, a bearing block, means carried by the block to provide one axis of oscillation for said block in said socket, and means loosely connecting the block and the plate to form a second axis for oscillation of said block.

6. A wing post socket of the character described, a socket plate, a bearing block, a torus portion shaped upon said block to provide one axis of oscillation therefor, and means loosely connecting the block and the plate to form a second axis of oscillation for said block.

7. A wing post socket of the character described, including a socket plate, a bearing block, means carried by the block to form one axis of oscillation therefor, and a U-bolt loosely connecting the block and the plate to provide a second axis of oscillation for said block in the plate.

8. A wing post socket of the character described, including a socket plate, a bearing block, means carried by the block to provide one axis of oscillation therefor, and a U-bolt providing an axis of oscillation for said block in a plane rectangularly opposed to the plane of the first said axis.

9. A wing post socket of the character described, including a socket plate, a bearing block, a torus portion shaped upon said block and having its lower surface seated in said socket plate, and a U-bolt embracing the torus and passing through the socket plate for maintaining the block against displacement therefrom.

10. A wing post socket of the character described, including a socket plate, a bearing block, means carried by the block to provide one axis of oscillation therefor, and a U-bolt arranged above the socket to loosely connect the block thereto, and to provide an axis of oscillation for the block in a plane spaced from the first said axis.

11. A wing post socket of the character described, including a socket plate, a bearing block, a torus portion carried by the block for oscillation in said socket plate longitudinally of said wing, and means loosely connecting the block and plate for oscillation of the former transversely of the wing.

12. A wing post socket of the character described, a socket plate formed with an elongated socket, and a bearing block mounted for oscillation along the major and minor axes of said socket.

13. A wing post socket of the character described, including a socket plate, a bearing block having a portion seatable in said plate, and a U-bolt extending through the block to embrace the block, the arms of said U-bolt extending through said plate to secure the same upon the wing.

14. A wing post socket of the character described, including a socket plate, a bearing block formed with a torus portion oscillatable in said plate, a U-bolt having a bight portion embracing the torus, arms formed on said bight portion for extension through said plate and the wing, and means preventing displacement of said arms.

15. A wing post socket of the character described, including a socket plate, a bearing block, attaching plates carried by said block for securement to the terminal of a wing post, and a U-bolt loosely engaging said block and extending through said socket plate for attachment thereon to the wing.

16. In a wing post socket of the character described, mating elements respectively carried by the post and the wing, a U-bolt loosely connecting the elements, and a clevis arranged for transverse connection with said bolt.

17. In a wing post socket of the character described, mating elements respectively carried by the post and the wing, a U-bolt loosely connecting the elements, and clevises arranged for longitudinal connection with said bolt.

18. In a wing post socket of the character described, mating elements respectively carried by the post and the wing, a U-bolt loosely connecting the elements, and clevises arranged to connect with said bolt in respectively transverse and longitudinal alinements.

19. In a wing post socket of the character described, a socket plate, a bearing block engageable with the plate, and a bolt formed with arms passing through the plate to connect the block thereto, slots in said plate being elongated to accommodate said bolt arms for transverse displacement.

20. In a wing post socket of the character described, the combination with socket elements, of a bolt connecting such elements, a washer plate associated with the bolt, and a socket formed in the plate, and provided with an elongated slot to receive said bolt thereon for transverse adjustment.

21. A wing post socket of the character described, including a socket plate, a bearing block, a U-bolt freely connecting the block and the plate and extending through the latter for attachment thereof to the wing, and a plate connecting the arms of the U-bolt on the opposite side of the wing from said socket plate.

22. In a wing post socket of the character described, the combination with a wing and its spar, of a socket plate supported upon the wing, a bearing block engageable with the plate, a U-bolt freely connecting the block and the plate and having its arms extended from said spar, a bolt plate connecting the arms, and means carried by the arms and engageable with the plate to prevent displacement of said bolt.

23. In a wing post socket of the character described, in combination with a wing and its spar, of a socket plate carried by the wing, a bearing block engageable with the plate, a U-bolt loosely connecting the block and the plate and having its arms extended from said spar, a socket plate connecting said extended arms and formed with sockets adjacent the point of connection, and means carried by each arm to prevent displacement thereof from the spar, the said means being receivable in the corresponding socket of said bolt plate.

24. In a wing post socket of the character described, in combination with a wing and its spar, of a socket plate, a bearing block engageable with the plate, a U-bolt having its bight portion freely connecting the block and the plate, and having its arms extending through said spar, stays for the wing adapted to be anchored upon said bight portion, nuts carried by said extended arms to prevent displacement of said bolt, and means connecting said arms and engaging said nuts to prevent contact between the latter and said wing.

25. In a device of the character described, a wing post, a socket carried on an extremity of the post, and a jog formed integrally with the post to extend rearwardly from said socket in streamline form.

26. In a device of the character described, a wing post, a socket carried at the end of said post, and a jog formed integrally on the post terminal to overlie the socket and to taper rearwardly from the socket's greatest width in streamline form.

27. In a device of the character described, a socket block formed with a flattened upper surface, a wing post adapted to have one terminal engage with said flattened block surface, plates carried by said block to extend along said post in order to define an open socket in conjunction with said surface, and means connecting said plates through said post to provide the only obstruction to a sidewise withdrawal of said post from said block surface.

28. A wing post socket including a socket plate, a bearing block seated in the socket of said plate and means limiting the direction of oscillation of said block in said socket.

29. A wing post socket including a socket plate, a bearing block seated in the socket of said plate and means limiting oscillation of said block in the socket to a pair of rectangularly opposed planes.

30. A wing post socket including a socket plate, a bearing block and means including elongated bearing surfaces formed on both the socket and the block to limit the direction of oscillation of the block in the socket.

31. A wing post socket including a socket plate, a bearing block and means including elongated bearing surfaces formed on both socket and the block to permit oscillation of the latter only along the major and minor axes of said socket plate.

32. A wing post socket for aeroplanes including a bearing member, a socket member, and a one-piece substantially U-shaped retaining member having its bight portion extended sufficiently beyond the sides of the post to provide anchorages for the wing structure brace wires.

33. In a wing post socket of the character described, the combination of stay wires for the wing post, a socket plate and a bearing block comprising the wing post socket and means triply functioning to connect the socket plate and bearing for relative movement, to limit such movement to oscillation about axes defined by the means and to anchor said stay wires to the post.

34. The combination with an aeroplane having aerial surfaces and wing posts connecting the surfaces, of a socket elongated in the direction of the longitudinal axis of said aeroplane and a bearing carried by a wing post for oscillation within the socket along the major and minor axes thereof in adjusting the dihedral angle and the stagger of said aerial surfaces.

35. The combination with an aeroplane having aerial supporting surfaces and wing posts connecting the surfaces, of a socket carried by a surface, a bearing carried by a post for seating in said socket and having oscillation within said socket in directions parallel only to the longitudinal and transverse axes of said aeroplane in adjusting the dihedral angle and the stagger of said aerial surfaces, and means to restrict the degree of said oscillation.

36. A wing post socket for aeroplanes including a bearing member, a socket member, and a freely insertible substantially U-shaped retaining member having its bight portion arched above the point of contact between said socket member and said bearing member and its legs laterally spaced from the sides of the post to prolong said bight portion that it may function conjointly as a retaining means for the wing structure brace wires.

37. A wing post socket including a socket plate, a bearing block, and an elongated bearing surface formed on the bearing block to engage with a similarly elongated bearing surface formed on the bearing plate to permit of oscillation of the block in a predetermined plane.

38. A wing post socket including a socket plate, a bearing block, and an elongated bearing surface formed on the bearing block to engage in a similarly elongated recessed bearing surface formed on the bearing plate to permit of oscillation of the block in a predetermined plane.

39. A wing post socket including a socket plate, a bearing block, and a means dually functioning to maintain the bearing block in engagement with the plate and the plate against movement with respect to its support.

40. A wing post socket including a socket plate, a bearing block, and means dually functioning to direct the oscillatory movement of the bearing block along the major axis of said plate and to maintain said plate against movement with respect to its support.

41. A wing post socket including a ball member, a socket member, and means limiting the direction of oscillation of said ball member in said socket.

42. In a device of the character described, a wing post, a socket carried on an extremity of the post, and means on the post to extend rearwardly from said socket in streamline form.

In testimony whereof we affix our signatures.

JOHN P. TARBOX.
HENRY KLECKLER.

Copies of this patent may be obtained for five cents each, by addressing the "Commissioner of Patents, Washington, D. C."